United States Patent Office 2,882,598
Patented Apr. 21, 1959

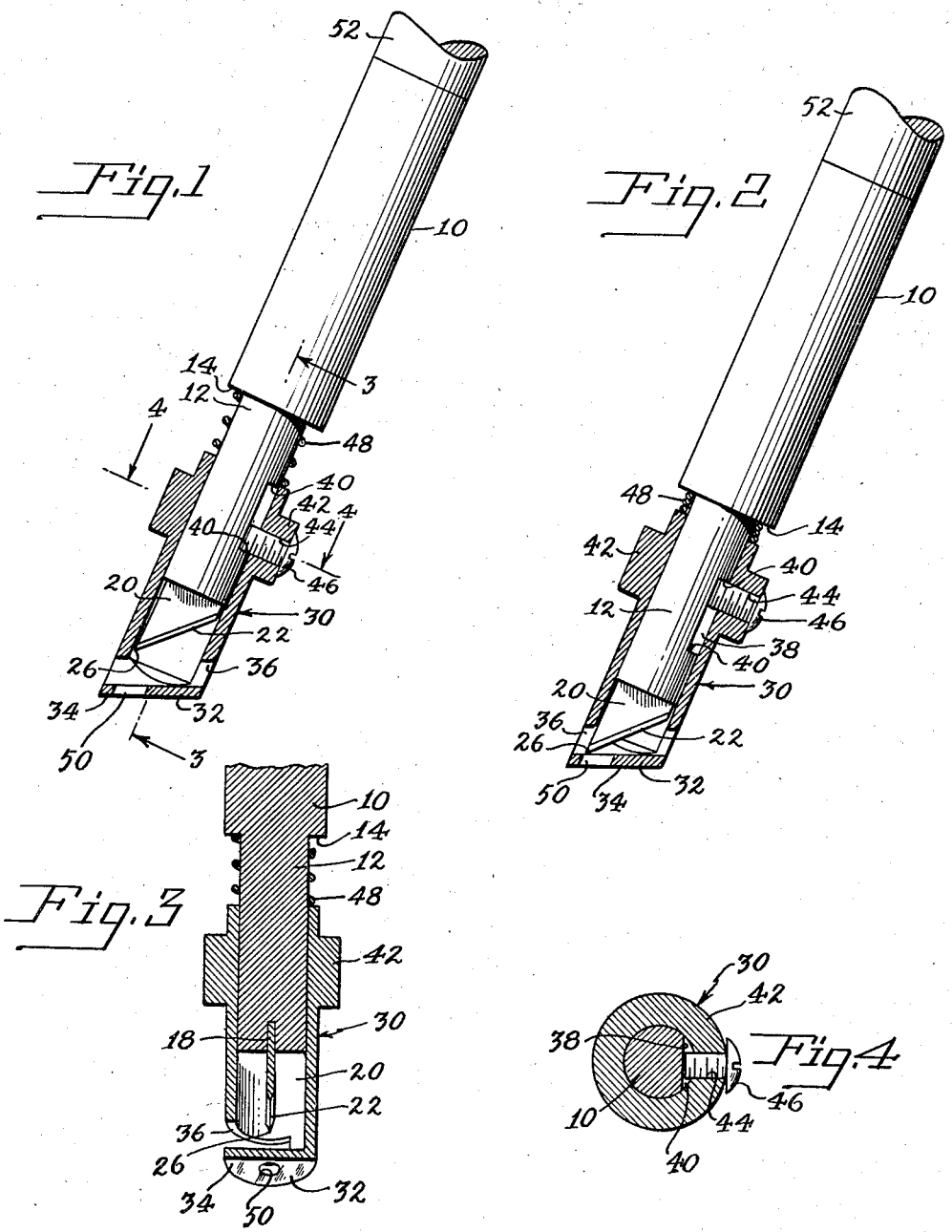

2,882,598

CUTTING DEVICE

Paul H. Fidelman, New York, N.Y., assignor of 80/100 to Nathan M. Markowitz, 6/100 to Bernard Gordon, 5/100 to Howard W. Gordon, and 3/100 to Lemuel Bannister, all of New York, N.Y.

Application February 27, 1956, Serial No. 567,757

7 Claims. (Cl. 30—294)

The present invention relates to a cutting device, and especially to a cutting device particularly adapted for use in cutting open letter envelopes or the like along an edge thereof.

It is an object of the present invention to provide a cutting device of the character described which is of compact construction and is of sufficient thinness that it may be formed for use in association with a writing implement or similar article, as an end piece thereof.

It is also an object of the present invention to provide a cutting device of the character described which is safe to use without any risk of injury to the person of the user.

It is another object of the present invention to provide a cutting device of the character described which is safe to use for opening envelopes without risk of damage to the contents thereof.

It is still another object of the present invention to provide a cutting device of the character described which is simple, easy and convenient to use and is highly efficient for its purposes.

It is a further object of the present invention to provide a cutting device of the character described which is of neat, attractice and decorative shape and appearance.

It is a still further object of the present invention to provide a cutting device of the character described which is of simple, yet sturdy and durable construction and is economical to produce and assemble.

The foregoing and other advantages and objects of the cutting devices of the present invention will become more readily apparent to those skilled in the art from the embodiment thereof shown in the accompanying drawing and from the description following. It is to be understood, however, that such embodiment is shown by way of illustration only, to make the principles and practice of the invention more readily comprehensible, and without any intent of limiting the invention to the specific details therein shown.

In the drawings:

Fig. 1 is an elevational and partly vertical, sectional fragmentary view of a cutting device of the present invention, shown disposed in operating position with the cutting blade in non-operative position; and Fig. 2 is a similar view of the same, with the cutting blade in operative position;

Fig. 3 is a section taken on line 3—3 of Fig. 1; and

Fig. 4 is a section taken on line 4—4 of Fig. 1.

Referring more specifically to the accompanying drawings, the cutting device of the present invention comprises a stem portion, 10, preferably in the form of a metallic rod, of preferably cylindrical shape and having a reduced portion, 12, of preferably cylindrical shape, at one end thereof, forming the shoulder 14. The end portion 12 is provided with a relatively short, axially extending slot 18, opening into the end face thereof, into which is set a relatively short cutting blade, 20, having, preferably, a diagonal cutting edge, 22, terminating in a point 26.

The device of the present invention is further provided with a combined guard and work guide, of sleeve-like formation, generally designated as 30, whose bore fits snugly but slidably over the reduced end 12 of the stem 10, and encloses the blade 20. The guard sleeve 30 is provided with a closure wall 32, at its outer end, preferably set at an angle of approximately 30 degrees to the longitudinal axis of the sleeve 30; such closure or wall having a preferably smooth or polished outer surface 34 for easy gliding over a supporting surface. The sleeve 30 is formed with a substantially transverse guide slot 36, immediately above the closure wall 32 thereof, such slot 36 being parallel to said wall.

The sleeve 30 is mounted in any desired manner for limited telescopic movement on the reduced end portion 12, in a manner that in its outermost position the cutting blade 20, will be disposed therein entirely above the guide slot 36, and in its innermost position will have a portion of the cutting blade 20 disposed opposite guide slot 36, in operative position.

While any suitable means may be employed for mounting the sleeve 30 for limited telescopic movement on the reduced end 12, I have illustrated one such means which is both effective for its purposes and convenient for assembling. Such means comprises a longitudinally extending suitably disposed, reduced portion formed on the stem end 12, which may be formed by cutting away a portion of the surface thereof to leave a flat surfaced groove or recess 38, having a shoulder 40, at each end. The guard sleeve 30 is preferably provided with an annular rib 42 adjacent to its upper end, in which is formed a tapped opening 44, in which is adjustably set a screw 46, the end of which may reciprocate within the recess of groove 38. The groove 38 and the tapped opening 44 may be formed in such predetermined position that, when assembled, the blade edge 22 will face diametrically across the guide slot 36.

Means are provided for normally resiliently keeping the guide sleeve 30 in blade shielding position, that is, in its extreme withdrawn position. Such means may comprise an expansion coil spring, 48, which is mounted over the reduced stem end 12, intermediate the shoulder 14 and the inner end of the sleeve 30.

If desired, the closure wall 32 of the sleeve 30 may be provided with an aperture 50, opposite the blade point 26, to accommodate such blade point in compensation for any possible variations in blade length or sleeve mounting that might otherwise cause the blade point to impinge upon the closure wall 32.

The stem 10 may be provided at its other end with handle means 52, which is only fragmentarily shown in the drawing, and which may be of any suitable material as metal, wood or plastic and ornamental or utilitarian characteristics. Such handle may for instance, if desired, comprise a mechanical pencil or a ball point pen or similar useful devices.

In use, as for opening an envelope, the device is placed with the sleeve closure wall 32, flat on a supporting surface, as the top of a desk, in the position illustrated in Figs. 1 and 2, thereby disposing the stem and handle at a convenient angle for operating purposes. The edge of an envelope is then inserted into the guide slot 36, and while the envelope is held in fixed position with one hand, the stem 10 is simultaneously pressed down with the other hand until the point 26 of the blade 20 engages the edge of the envelope, and simultaneously moved to cut or slit the envelope edge. By so forming and arranging the blade that its point 26 is disposed closely adjacent to the inner end of the guide slot 36, assurance is provided that the slit in the envelope will be formed closely adjacent to the edge thereof so as not to cut the envelope contents.

This completes the description of the cutting device of the present invention. It will be readily apparent that such device is of slim and therefore compact shape, that it is safe to use, both for the operator and for the material upon which it is operated; that its blade is protected from damage when not in operation; and that it is easy and convenient to manipulate as well as attractive to keep on a desk.

It will be further apparent that numerous modifications and variations in the cutting device of the present invention may be made by anyone skilled in the art, in accordance with the principles of the invention hereinabove set forth and without exercise of any inventive ingenuity. I desire, therefore, to be protected for any and all such variations and modifications that may be made within the spirit of the invention, and the scope of the claims hereto appendant.

What I claim is:

1. A cutting device comprising an elongated stem portion, a cutting blade secured to said stem portion at one end thereof, and projecting axially therefrom, a guard sleeve telescopically, slidably mounted over said stem portion end and enclosing said blade, said guard sleeve having a work guide slot formed therein adjacent to and substantially parallel with its outer end, resilient means disposed between said stem portion and said sleeve normally maintaining said sleeve in extended position on said stem end with its guide slot in position beyond said blade, said resilient means being compressible to telescope said sleeve on said stem end and bring said guide slot into register with the end of said blade, and means limiting the telescopic movement of said sleeve on said stem end to prevent the projection of the end of said blade from the interior of said sleeve.

2. The cutting device of claim 1, wherein said stem is cylindrical and comprises a main portion and a reduced portion, forming a shoulder therebetween, and wherein said resilient means comprises a coil spring mounted on said reduced stem portion, intermediate said shoulder and the inner end of said sleeve.

3. The cutting device of claim 1, wherein the outer end of said sleeve is formed at an angle to the longitudinal axis thereof.

4. The cutting device of claim 1, wherein the outer end of said sleeve forms a closure wall, said closure wall having a smooth outer face adapted to slide easily over a supporting surface.

5. The cutting device of claim 1 where said cutting blade is formed with a tapering cutting edge, forming a point.

6. The cutting device of claim 1 wherein said blade is formed with a tapered cutting edge forming a point, and wherein the outer end of said sleeve forms a closure wall, said closure wall having an aperture formed therein opposite said blade point.

7. The cutting device of claim 1 wherein said means of limiting the movement of said sleeve on said stem end comprises a longitudinally disposed cut away portion on said stem end, said cut away portion formed with a shoulder at each end, and a screw set into said sleeve and extending into said cutaway portion.

References Cited in the file of this patent

UNITED STATES PATENTS

| | | |
|---|---|---|
| 2,483,750 | Bratrud | Oct. 4, 1949 |
| 2,700,820 | Garduno | Feb. 1, 1955 |